Feb. 7, 1950
A. W. THOMPSON ET AL
2,496,898
CHECK VALVE
Filed April 18, 1945
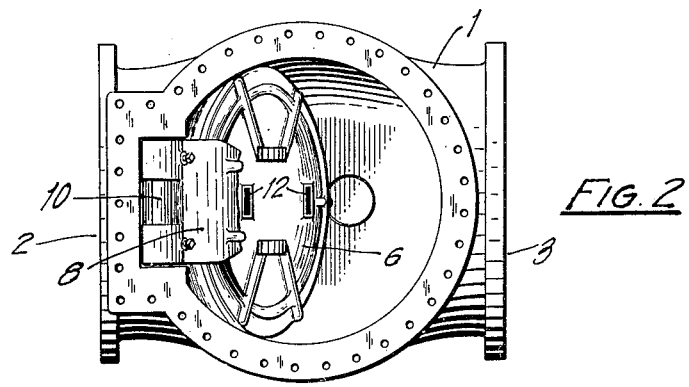
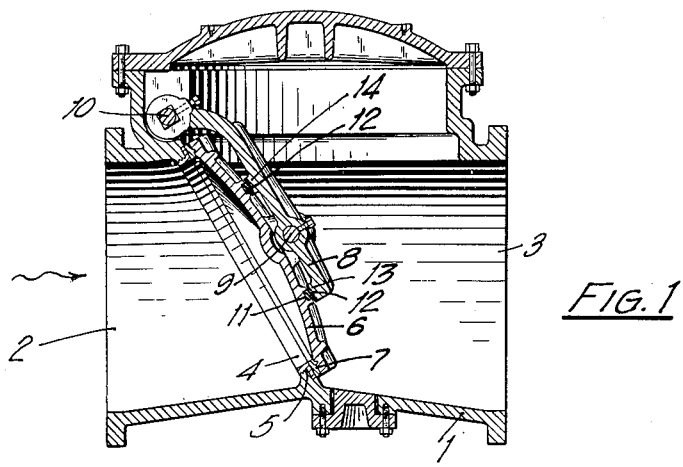
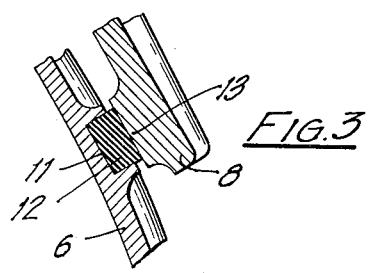
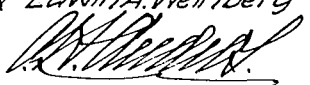
INVENTOR.
Alfred W. Thompson
BY Edwin A. Weinberg
ATTORNEY Patented Feb. 7, 1950

2,496,898

UNITED STATES PATENT OFFICE 2,496,898

CHECK VALVE

Alfred W. Thompson and Edwin A. Weinberg, Troy, N. Y., assignors to The Ludlow Valve Manufacturing Co., Inc., Troy, N. Y., a corporation of New York Application April 18, 1945, Serial No. 589,012

3 Claims. (Cl. 251—123)

Our invention relates to check valves and particularly to an improved gate suspension for valves of this type.

A common form of valve is provided with a gate hinge which is pivotally connected to a fixed part of the valve, and, usually the gate itself is pivotally attached to the hinge so that it may eventually align itself with its seat and provide a more perfect closure.

The movement of the gate about its pivotal connection to the hinge has heretofore been limited by various means and to various degrees with little or no regard to maintaining it at all times in the correct, or substantially correct, relation to the hinge to effect a proper contact of the seating surfaces as they approach each other on a closing of the valve. As a result, the gate, in closing, does not initially come squarely down against its seat. Either the top or the bottom edge of the gate is leading with the result that this leading edge first strikes the seat ring causing damage to the seating surfaces, chattering, and slamming of the gate against the seat ring.

One of the objects of our invention is to provide a gate suspension of the type in which the gate is pivotally connected to the hinge but in which movement of the gate about its pivotal connection to the hinge is limited equally and firmly in both directions. Another object is to provide a gate suspension of this type in which the gate and the hinge are held in yieldingly but substantially fixed relation to each other at all times. That is to say, the relative relationship of the hinge to the gate which exists when the gate is properly closed is substantially maintained in all positions of these parts. A further object is to provide a suspension for the gate of a check valve which will function at least partially to absorb the shock of its closing and to damp the vibrations set up thereby.

With these objects in view our invention includes the novel elements and the combinations and arrangements thereof described below and illustrated in the accompanying drawings in which—

Fig. 1 is a vertical longitudinal section through our preferred type of check valve;

Fig. 2 is a top plan view of our check valve with the cover removed and a portion of the hinge broken away; and Fig. 3 is an enlarged fragmentary sectional view of a detail shown in smaller scale in Fig. 1.

Referring to the drawings—

Our valve comprises a body 1 provided with an inlet 2 and an outlet 3. 4 is the seat ring which may be threaded into the body as shown at 5. 6 is the gate provided with the ring 7 adapted to seat on the ring 4. 8 is a hinge member which is pivotally secured to the gate 6 by means of the gate pin 9, and to the body 1 by means of the hinge pin 10.

It will be noted that the hinge member does not terminate substantially at the gate pin but extends a substantial distance beyond this pin.

In the preferred form of the invention shown in Fig. 3, the gate, on each side of the gate pin 9, and preferably equidistant from the axis of said pin, is provided with a recess 11 in which a resilient stop or bumper 12 (see Fig. 3) is seated, and the hinge member is provided with projections 13 and 14 which are positioned and adapted to cooperate with the resilient stop 12. Preferably, the stops 12 are slightly compressed between the hinge member and the gate so that they hold the gate and the hinge member in substantially fixed but yielding relation to each other. These stops are so adjusted that they are substantially equally compressed when the gate is in closed position. Thus the stresses therein are balanced and the gate is held in substantially fixed relation to the hinge member at all times.

It is quite important that the means cooperating with the hinge member and gate which closely limit their relative movement about the axis of the pin 9 be spaced substantial distances from the axis of said pin. By so spacing these portions, small differences in clearance resulting from wear, or existing when the parts are first assembled, do not materially affect the correct positioning of the seating surface on the gate.

By providing only a small degree of relative movement between the gate and the hinge member it will be apparent that when the gate approaches its seat the seating surfaces which cooperate will be substantially in correct alignment and damage to the seating surfaces through substantial misalignment will be avoided and therefore the seating surfaces will remain in better condition for a longer period of time than would otherwise be the case. Where resilient bumpers or stops are employed, the shock of closing will be partially absorbed or cushioned thereby and the vibrations which are ordinarily set up by the closing action of gates of the present type will be damped.

What we claim is:

1. A check valve comprising a body having an inlet and an outlet, a valve seat in said body, a gate having a seating surface adapted to cooperate with said seat for closing said valve, a hinge member, means pivotally connecting said hinge member to said body, a hinge connecting said hinge member in a zone intermediate the ends thereof to said gate, and separate resilient blocks substantially spaced from said hinge on opposite sides thereof in partially compressed condition between said gate and said hinge member and yieldingly maintaining said gate and hinge member in approximately the same relative positions which they occupy when said valve is closed; whereby, on the closing of said valve, the seating surface on said gate will contact said seat substantially throughout and chattering will be reduced.

2. A check valve comprising a body having an inlet and an outlet, a valve seat therein, a gate adapted to cooperate with said seat, a hinge member, means pivotally connecting said hinge member to said body, a hinge intermediate the ends of said hinge member connecting said hinge member to the central portion of said gate, and separate rubber blocks positioned between said hinge member and said gate on opposite sides of and substantially spaced from the axis of said hinge and yieldingly maintaining said gate and hinge member in substantially fixed relative relation.

3. A check valve comprising a body having an inlet and an outlet, a valve seat in said body, a gate having a seating surface adapted to cooperate with said seat for closing said valve, a hinge member, means pivotally connecting said hinge member to said body, a hinge connecting said hinge member in a zone intermediate the ends thereof to said gate, and separate resilient blocks substantially spaced from said hinge on opposite sides thereof and disposed between and in contact with said gate and said hinge member and yieldingly maintaining said gate and hinge member in approximately the same relative positions which they occupy when said valve is closed; whereby, on the closing of said valve, the seating surface on said gate will contact said seat substantially throughout and chattering will be reduced.

ALFRED W. THOMPSON.
EDWIN A. WEINBERG.

REFERENCES CITED

The following references are of record in the file of this patent:

UNITED STATES PATENTS

| Number | Name | Date |
| --- | --- | --- |
| 380,940 | Schutte | Apr. 10, 1888 |
| 508,246 | Schutte | Nov. 7, 1893 |
| 872,184 | Keil | Nov. 26, 1907 |
| 1,822,655 | Hamilton | Sept. 8, 1931 |
| 2,247,773 | Dunn | July 1, 1941 |
| 2,265,595 | Carlson | Dec. 9, 1941 |
| 2,312,290 | Smith | Feb. 23, 1943 |